United States Patent [19]
Clarke, Jr.

[11] Patent Number: 6,112,453
[45] Date of Patent: Sep. 5, 2000

[54] MOSQUITO LARVAE LIGHT TRAP

[75] Inventor: John L. Clarke, Jr., Riverside, Ill.

[73] Assignee: Clarke Engineering Technologies, Inc., Roselle, Ill.

[21] Appl. No.: 09/157,804

[22] Filed: Sep. 21, 1998

Related U.S. Application Data

[63] Continuation-in-part of application No. 08/740,433, Oct. 29, 1996, Pat. No. 5,815,980.

[51] Int. Cl.[7] .................................................. A01M 1/04
[52] U.S. Cl. .................................... 43/113; 43/17.5
[58] Field of Search .......................... 43/55, 58, 17.5, 43/132.1, 113

[56] References Cited

U.S. PATENT DOCUMENTS

| | | | |
|---|---|---|---|
| 3,951,104 | 4/1976 | Neff | 43/100 |
| 5,896,697 | 4/1999 | Kang | 43/107 |

*Primary Examiner*—Kurt Rowan
*Attorney, Agent, or Firm*—McEachran, Jambor, Keating, Bock & Kurtz

[57] ABSTRACT

A device for the control of mosquito larvae includes a float with a self-contained power source associated with the float. There is a light source which extends downwardly from the float and is connected to the power source for activation thereof. A walled enclosure depends from the float, which walled enclosure will be filled with water when the float is placed upon the surface of a body of water. The light source is positioned within the enclosure and is directionalized toward the exterior thereof generally parallel to the water surface. There are openings in the enclosure beneath the water surface and in alignment with the light source for the passage of mosquito larvae into the enclosure when attracted by light from the source. The mosquito larvae so attracted by light from the source will swim into the enclosure, through the opening, seeking air and will shortly expire due to the lack of air within the enclosure.

6 Claims, 1 Drawing Sheet

U.S. Patent      Sep. 5, 2000      6,112,453
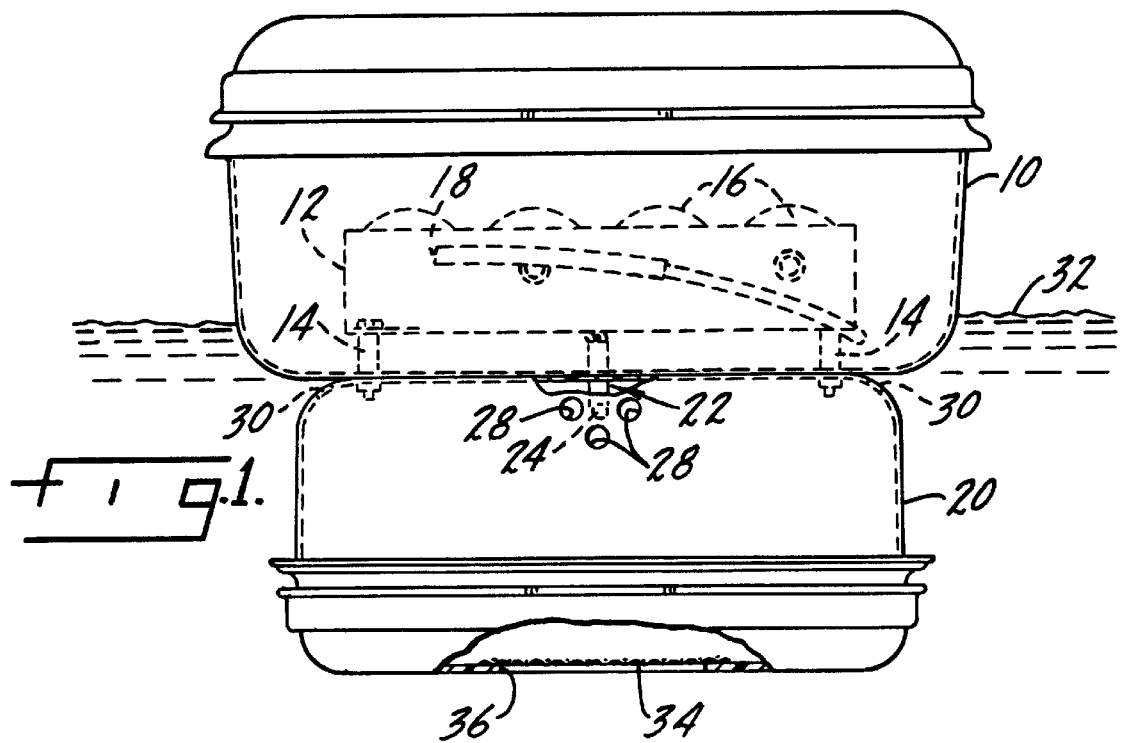
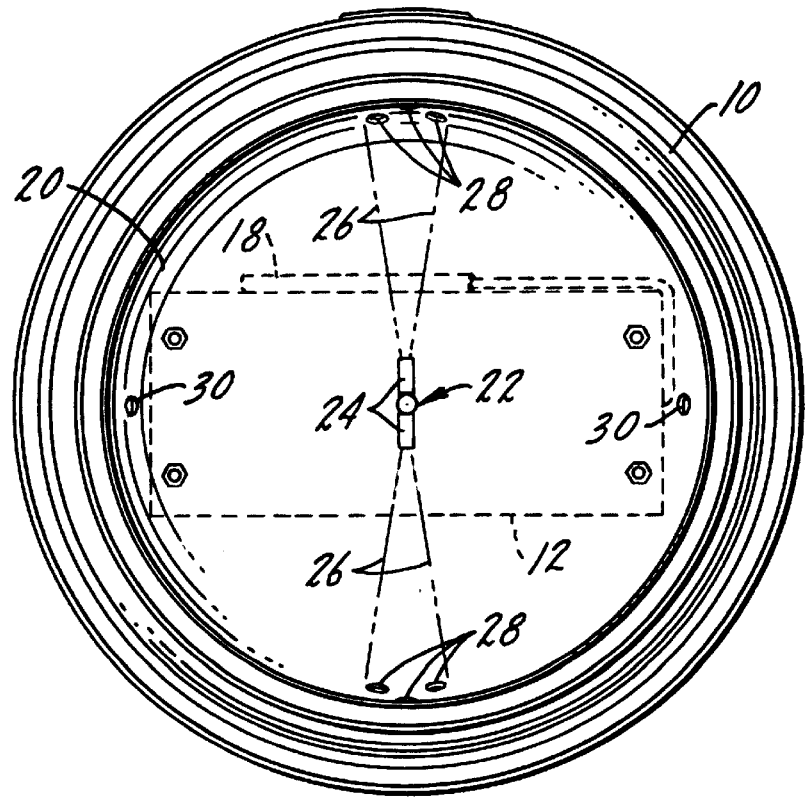

MOSQUITO LARVAE LIGHT TRAP

This application is a continuation-in-part of application Ser. No. 08/740,433, filed Oct. 29, 1996, now U.S. Pat. No. 5,815,980.

THE FIELD OF THE INVENTION

There are two principal methods for the control of mosquitoes. One method seeks to destroy the mosquito itself, commonly by spraying. Such a process is not always favored in some areas due to the perceived environmental problems associated with the spraying of insecticides. A more acceptable procedure is to destroy mosquito larvae. This can be done by the distribution of an insecticide in pellet or briquette form in swampy areas or within a body of water.

The present invention is directed to the control and destruction of mosquito larvae by providing a light trap which floats upon the surface of a body of water in which mosquito larvae may be present. The larvae are attracted to light, as they believe it represents the surface of the body of water and larvae must periodically have access to air in order to sustain life. The light trap of the present invention utilizes light emitting diodes as light sources, with the light emitting diodes extending radially outwardly beneath the water surface from a floating container which has a self-contained power source, such as batteries. There is a walled enclosure depending downwardly from the float and spaced openings in the walled enclosure generally in alignment with the radial light sources. The mosquito larvae are attracted by the light, will swim into the enclosure, and will shortly expire as there is no air within the enclosure.

The invention may not only be used for the control or elimination of mosquito larvae, but may also be used as a means for determining the larvae population in a particular body of water. The lower end of the enclosure into which the mosquito larvae swim may be either open, in which case the dead larvae will fall down into the bottom of the body of water and become part of the food chain, or there may a cover, either closed or as a screen at the bottom of the enclosure, which will collect the mosquito larvae which have been destroyed.

SUMMARY OF THE INVENTION

This is a continuation-in-part of copending application Ser. No. 08,740,433, filed Oct. 29, 1996.

The present invention relates to a device for controlling mosquito larvae and more specifically to what is termed a light trap for attracting and destroying mosquito larvae.

A primary purpose of the invention is a simply constructed, reliably operable light trap for the elimination of mosquito larvae in a body of water.

Another purpose is a light trap as described, which utilizes directionalized light emitting diodes positioned generally in alignment with spaced openings into an enclosure depending downwardly from a floating power source.

Another purpose is a mosquito larvae light trap as described, which may be used either as a means for controlling larvae, by the elimination thereof, or as a means for collecting larvae which have been destroyed to determine the population of such within a body of water.

Other purposes will appear in the ensuing specification, drawings and claims.

BRIEF DESCRIPTION OF THE DRAWINGS

The invention is illustrated diagrammatically in the following drawings wherein:

FIG. 1 is a side view, in part section, of the mosquito larvae control device of the present invention, and FIG. 2 is a bottom view of the larvae control device.

DESCRIPTION OF THE PREFERRED EMBODIMENT

The use of light traps for the attraction and subsequent destruction of mosquito larvae has been described in the following articles: "An Aquatic Light Trap for Possible Use in Mosquito Larvae Surveillance," by R. G. Weber, published in *Proceedings of Seventy-Second Annual Meeting of the New Jersey Mosquito Control Association, Inc.*; "A Novel Light Source and Small Subaquatic Light Trap for Sampling Culex Larvae," by R. G. Weber, published in *Proceedings of Seventy-Sixth Annual Meeting of the New Jersey Mosquito Control Association, Inc.*; "An Underwater Light Trap for Collecting Bottom-Dwelling Aquatic Insects," by R. G. Weber, published in the November & December, 1987, issue of *Entomological News*; "Selecting and Maintaining Batteries for Portable Light Traps," by R. G. Weber, published in *Proceedings of Seventy-Fifth Annual Meeting of the New Jersey Mosquito Control Association, Inc.*; "Response of Larval Culex Pipiens (Diptera: Culicidae) to Light Produced by Light Emitting Diodes," by R. G. Weber, published in the May & June, 1989, issue of *Entomological News*.

In the published articles, the enclosure floats horizontally on its side and only emits light in one direction. The mosquito larvae accumulate, block the opening, and in essence turn the trap off. This type of device has the clear disadvantage of restricting the entrance of mosquito larvae and not providing sufficient access to the interior of the enclosure to those larvae attracted by the light.

The present invention overcomes the problems associated with prior art light traps in that it has a pair of directionalized light emitting diodes which emit light in a direction generally parallel with the water surface toward the exterior of a walled enclosure. There are openings aligned with each of the LEDs for the attraction of mosquito larvae. The invention is particularly concerned with the destruction of a type of mosquito known as anopheles, which mosquitos transmit malaria. Mosquito larvae of this type generally lie parallel with the water surface and slightly below it. Accordingly, the light source for the present invention will be approximately 1½" below the surface of a body of water, which is generally the area where anopheles larvae are present. The directionalized light sources will emit light parallel with the surface of the body of water and toward the spaced openings in the walled enclosure forming the light trap, and will attract the desired larvae which will swim into the enclosure seeking air. Since there is no air within the enclosure, as it is completely filled with water, such larvae will shortly expire.

The bottom of the enclosure may either be open, in which case the larvae will drift to the bottom and become part of the food chain, or there may be a screen or other type of collection device for accumulating the larvae for use as an indication of the larvae population within the body of water.

In FIG. 1 there is a flotation device 10, which may be a plastic enclosure, within which is positioned a power source 12 which may be a battery pack mounted on posts 14 within the enclosure 10. The batteries are indicated at 16. There may be a light sensor 18 associated with the batteries and a switch, not shown, so that the light trap will only be activated when the surrounding area is dark. Normally, a light trap of this type is only effective in the nighttime hours.

Attached beneath the flotation device 10 is a walled enclosure 20, which again may be made of a suitable plastic, and is attached to the flotation device 10 by the posts 14 which mount the battery pack 12.

Depending downwardly from the center of the battery pack, and activated by the batteries therein, is a light source indicated generally at 22 in FIG. 2. The light source 22 may include a pair of directionalized light emitting diodes 24, each of which emits a cone of light as defined by the lines 26.

In alignment with each of the LEDs 24 and their directionalized cones of light 26, are a plurality of openings 28 formed in the walled enclosure 20. There may be three such openings in each grouping, but the invention should not be so limited. What is important is to provide a plurality of relatively small openings for the entrance of mosquito larvae into the walled enclosure 20. There are vent openings 30 near the upper portion of the walled enclosure 20 so as to permit air to escape and the enclosure to be completely filled with water when it is placed upon the surface of the body of water indicated at 32.

The bottom of the enclosure 20 may include a screen 34 which covers an opening 36 within the enclosure bottom. In the alternative, such screen may be omitted and the destroyed mosquito larvae will drift to the bottom of the body of water to become a part of the food chain.

Typically, the batteries 16 may be connected in series and the electrical circuit may include a resistance, as normally light emitting diodes of the type used herein require 2.8 volts. The battery pack will be raised off of the bottom of the flotation device 10 by the posts 14 to prevent battery corrosion.

In use, the flotation device 10 will be placed upon a body of water and the weight of the light trap, plus that of the battery package therein, will cause the flotation device to sink slightly beneath the surface 32 of the water such that the enclosure 20 will be completely filled with water. Air within the enclosure will escape through the vent holes 30. The walled enclosure 20 will be positioned beneath the surface of the body of water such that the openings 28 will be generally 1½" below the water surface and will be generally in alignment with the directionalized light emitting diodes 24 and their cones of light indicated at 26. The larvae will be attracted by the light emitting diodes, as they periodically require 10 air to sustain life, and associate life with the surface of a body of water where air is present. Thus, the larvae will swim through the openings 28 into the enclosure and they will be trapped therein. Since there is no air within the enclosure, normally the larvae will expire within a very short period of time. The larvae which have thus died will either float downwardly through an open bottom, if there is no screen present, or they will be collected by the screen, which will provide an indication of the larvae population within the body of water.

The invention uses batteries as the power source. There will be a day/night timer or cutoff switch associated with the batteries, as the mosquito control device disclosed herein will normally only be used at night where the light will provide the attraction means in an otherwise dark environment. Although the invention shows batteries as the sole power source, it may also be within the scope of the invention to provide a solar powered source to recharge the batteries during the day. Thus, with a day/night timer and a solar cell to charge the batteries, the control device may have an essentially infinite life when placed within a body of water.

Of particular advantage is the use of directionalized light emitting diodes which are aimed at restricted openings in the side of the enclosure 20. The openings are small enough to permit the larvae to enter the enclosure, but normally will not permit them to leave, as the larvae will be attracted by the light emitting diodes 24. Both the openings and the light emitting diodes will normally be slightly beneath the surface of the body of water and particularly at a depth so as to attract anopheles larvae, the principal larvae which the present invention is designed to attract and destroy.

Whereas the preferred form of the invention has been shown and described herein, it should be realized that there may be many modifications, substitutions and alterations thereto.

The embodiments of the invention in which an exclusive property or privilege is claimed are defined as follows:

1. A device for the control of mosquito larvae including flotation means, a self-contained electrical power source associated with said flotation means, a light source extending downwardly from said flotation means and connected to said power source for activation thereof, a walled enclosure depending from said flotation means, which enclosure will be filled with water when said flotation means is placed upon the surface of a body of water, said light source including a pair of directionalized light emitting devices, each extending in generally opposite directions and each being directed toward the exterior of said enclosure generally parallel to the water surface, opening means in said enclosure, beneath the water surface and in radial alignment with each of said directionalized light light emitting devices, said opening means providing for the passage of mosquito larvae into said enclosure when attracted by light from said directionalized light emitting devices, whereby mosquito larvae will swim into said enclosure, through said opening means, seeking air and will shortly expire due to the lack of air within said enclosure.

2. The mosquito control device of claim 1 wherein said light emitting devices are LEDs.

3. The mosquito control device of claim 1 wherein each of said opening means includes a plurality of closely spaced openings.

4. The mosquito control device of claim 1 wherein the lower end of said enclosure includes collection means which will collect mosquito larvae which have expired within the enclosure.

5. The mosquito control device of claim 1 wherein said enclosure includes vent holes adjacent an upper portion thereof.

6. A device for the control of mosquito larvae including a container having a chamber forming a flotation device, a self-contained electrical power source including at least one battery positioned within said chamber, a light source extending downwardly from said chamber and connected to said power source for activation thereof, a walled enclosure depending from said container, which enclosure will be filled with water when said container is placed upon the surface of a body of water, said light source being positioned within said enclosure and being directionally oriented generally parallel to the water surface toward the exterior of said enclosure, opening means in said enclosure beneath the water surface and in alignment with said directionalized light source, said opening means providing for the passage of mosquito larvae into said enclosure when attracted by light from said source, whereby mosquito larvae will swim into said enclosure, through said opening means, seeking air, and will shortly expire due to the lack of air within said enclosure.

* * * * *